(12) United States Patent
White et al.

(10) Patent No.: US 7,717,525 B2
(45) Date of Patent: May 18, 2010

(54) SPINDLE AND HUB ASSEMBLY

(75) Inventors: David Richard White, Fayette, AL (US); Robert H. Wheeler, Guin, AL (US)

(73) Assignee: Continental Conveyor & Equipment Company, Winfield, AL (US)

( * ) Notice: Subject to any disclaimer, the term of this patent is extended or adjusted under 35 U.S.C. 154(b) by 553 days.

(21) Appl. No.: 11/053,458

(22) Filed: Feb. 8, 2005

(65) Prior Publication Data

US 2006/0175893 A1    Aug. 10, 2006

(51) Int. Cl.
*B60B 23/00* (2006.01)
*F16C 43/04* (2006.01)

(52) U.S. Cl. .................. 301/111.03; 301/132; 384/585

(58) Field of Classification Search .............. 301/105.1, 301/108.1, 111.01, 114–115, 122, 111.03, 301/131–132
See application file for complete search history.

(56) References Cited

U.S. PATENT DOCUMENTS

| | | | |
|---|---|---|---|
| 1,842,971 A * | 1/1932 | Hughes | ...................... 384/547 |
| 3,395,950 A * | 8/1968 | Brandt | ..................... 301/108.1 |
| 3,515,448 A | 6/1970 | Williams et al | |
| 3,765,737 A | 10/1973 | Hatch | |
| 4,530,144 A | 7/1985 | Hagelthorn | |
| 4,613,240 A | 9/1986 | Hagelthorn | |
| 4,654,913 A | 4/1987 | Grube | |
| 5,090,778 A | 2/1992 | Laudszun et al. | |
| 5,342,130 A | 8/1994 | Kulczycki | |
| 5,425,585 A | 6/1995 | Hoffmann et al. | |
| 5,533,849 A | 7/1996 | Burdick | |
| 5,795,037 A | 8/1998 | Hagelthorn | |
| 6,485,188 B1 * | 11/2002 | Dougherty | ............... 301/105.1 |
| 6,488,342 B1 * | 12/2002 | De Paiva | ................. 301/108.1 |
| 6,948,782 B2 * | 9/2005 | Porter et al. | ............. 301/105.1 |

* cited by examiner

*Primary Examiner*—Jason R Bellinger
(74) *Attorney, Agent, or Firm*—Pearne & Gordon LLP

(57) ABSTRACT

A spindle and hub assembly for a vehicle wheel is constructed so that, in the event of a failure of the bearing arrangement rotatably supporting the hub on the spindle, separation of the hub from the spindle will not immediately occur but will be prevented for a period of time sufficient for the operator of the vehicle to safely continue to advance the vehicle to a location where corrective action may be taken. An annulus supported on the spindle is secured to the spindle by a nut separate from the annulus, and the annulus has an outside diameter large enough such that a shoulder located within the opening in the hub through which the spindle extends is capable of engaging the annulus in the absence of the bearing arrangement, thereby preventing the hub from separating from the spindle.

3 Claims, 2 Drawing Sheets

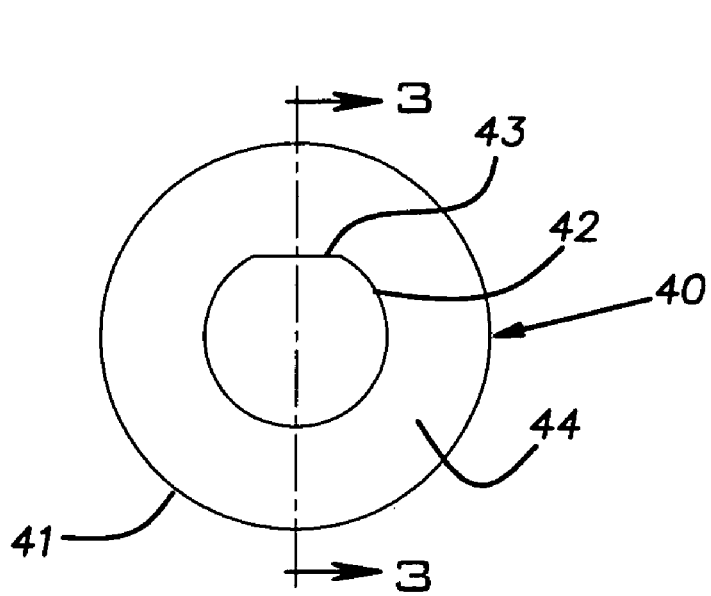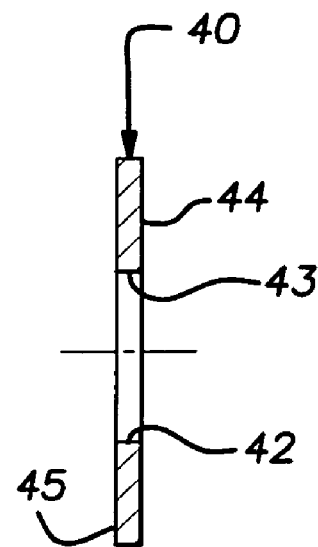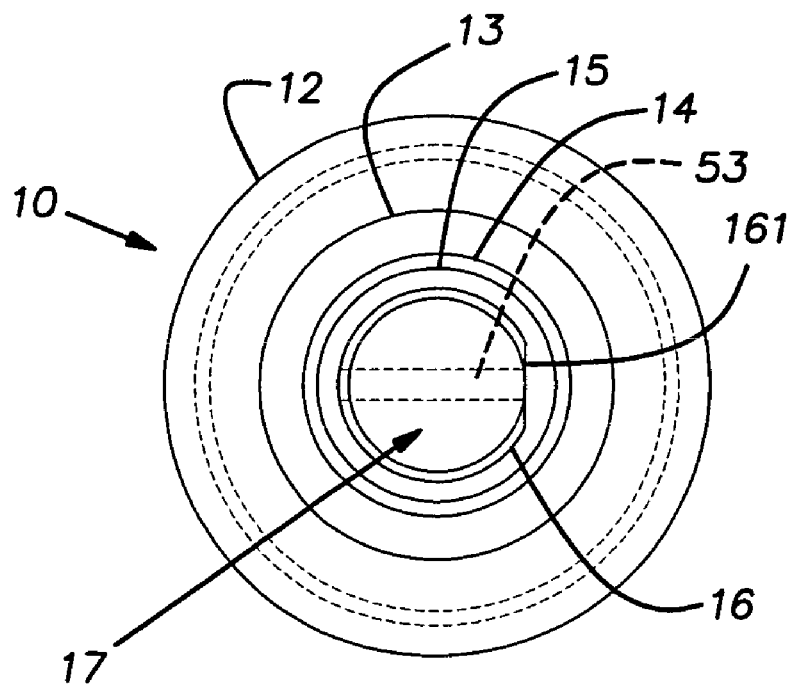

US 7,717,525 B2

SPINDLE AND HUB ASSEMBLY

FIELD OF THE INVENTION

This invention relates to spindle and hub assemblies and, particularly, to spindle and hub assemblies wherein the hub is maintained on the spindle for a period of time, and does not immediately separate from the spindle, in the event of a failure of a bearing arrangement that rotatably supports the hub on the spindle.

BACKGROUND OF THE INVENTION

Spindle and hub assemblies, wherein the hub is rotatably mounted on the spindle and a tire of some type is mounted on the hub, are used in connection with the transportation of a variety of vehicles. For example, such assemblies are used on trailers and, in some instances, with the front wheels of motor vehicles, including trucks and automobiles. The hubs, typically, are supported on the spindles by bearing arrangements whereby the hubs may freely rotate on the spindles. A usual type of bearing arrangement that is applied comprises roller bearings that are circumferentially spaced about the spindle and are held in place between the raceways of a circular inner race that circumferentially engages the spindle and a circular outer race that circumferentially engages an inside diameter of the hub. A retaining nut and washer are commonly used to retain the hubs on the spindles. The spindles may simply comprise the ends of unitary axles or the spindles may be constructed separately for attachment to an axle. Additionally, the spindles may simply be secured to the vehicle directly without the use of an axle.

The particular constructions for rotatably mounting and retaining the hubs on the spindles are varied. It may be possible that a hub will separate from an associated spindle in the event of a failure of the bearing arrangement that rotatably supports the hub on the spindle. A spindle and hub assembly that would allow the hub to remain on the spindle for a period of time while the vehicle continues to proceed along a roadway, notwithstanding a failure of the bearing arrangement, may have some beneficial aspects.

SUMMARY OF THE INVENTION

The present invention concerns a spindle and hub assembly for a vehicle wheel wherein, in the event of a failure of the bearing arrangement rotatably supporting the hub on the spindle, separation of the hub from the spindle will not immediately occur but will be prevented for a substantial period of time sufficient for the operator of the vehicle to safely continue to advance the vehicle to a location where corrective action may be taken.

According to one aspect, a spindle and hub assembly comprises a spindle having a first end and a second end and a hub having an inboard end and an outboard end. An opening in the hub extends between and through the inboard end and outboard end of the hub and the spindle extends through the opening in the hub. The inboard end of the hub is located adjacent the second end of the spindle and the outboard end of the hub is located adjacent the first end of the spindle. The opening in the hub has a first diameter toward the inboard end of the hub and a second diameter larger than the first diameter toward the outboard end of the hub with the transitional portion of the opening in the hub between the first diameter and the second diameter forming a shoulder in the opening in the hub. A bearing arrangement includes a bearing component that is mounted about the spindle and supports the hub for rotation of the hub on the spindle The bearing arrangement has an inward surface that faces the inboard end of the hub and abuts the shoulder in the opening in the hub and an outward surface that faces the outboard end of the hub. The spindle and hub assembly further comprises an annulus that has an opening through it and an outside diameter. The first end of the spindle extends through the opening in the annulus so that the annulus is supported on the first end of the spindle. The annulus has an inward surface that faces the outward surface of the bearing component and an outward surface that faces the outboard end of the hub. The outside diameter of the annulus has a larger diameter than the first diameter of the opening in the hub whereby the shoulder in the opening in the hub is capable of engaging the inward face of the annulus in the absence of the bearing arrangement. Means separate from the annulus is located at the first end of the spindle for securing the annulus on the spindle.

According to another aspect, the first end of the spindle includes a flat portion and the opening through the annulus includes a complementary flat portion that is in engagement with the flat portion of the first end of the spindle whereby the annulus does not rotate with respect to the spindle.

According to a further aspect, the means separate from the annulus located at the first end of the spindle for securing the annulus on the spindle bears against the outward surface of the annulus and causes the inward surface of the annulus to bear against the outward surface of the bearing component and secure the bearing component in place against the shoulder in the hub. In a particular aspect, the means separate from the annulus located at the first end of the spindle for securing the annulus on the spindle includes screw threads on the first end of the spindle and a nut, having complementary screw threads, screwed to the screw threads on the first end of the spindle. In addition, the means separate from the annulus located at the first end of the spindle for securing the annulus on the spindle can include an opening that extends through the flat portion and the centerline of the spindle and a locking pin extending through the opening in the spindle secured to the spindle and the nut so as to prevent the nut from coming loose from the spindle.

BRIEF DESCRIPTION OF THE DRAWINGS

FIG. 2 is a plan view of the annulus that is a part of the spindle and hub assembly shown in FIG. 1.

FIG. 3 is a cross-sectional view of the annulus taken along the line 3-3 in FIG. 2.

FIG. 4 is an end view of the spindle shown in FIG. 1.

DETAILED DESCRIPTION OF AN EMBODIMENT OF THE INVENTION

Figure 1:
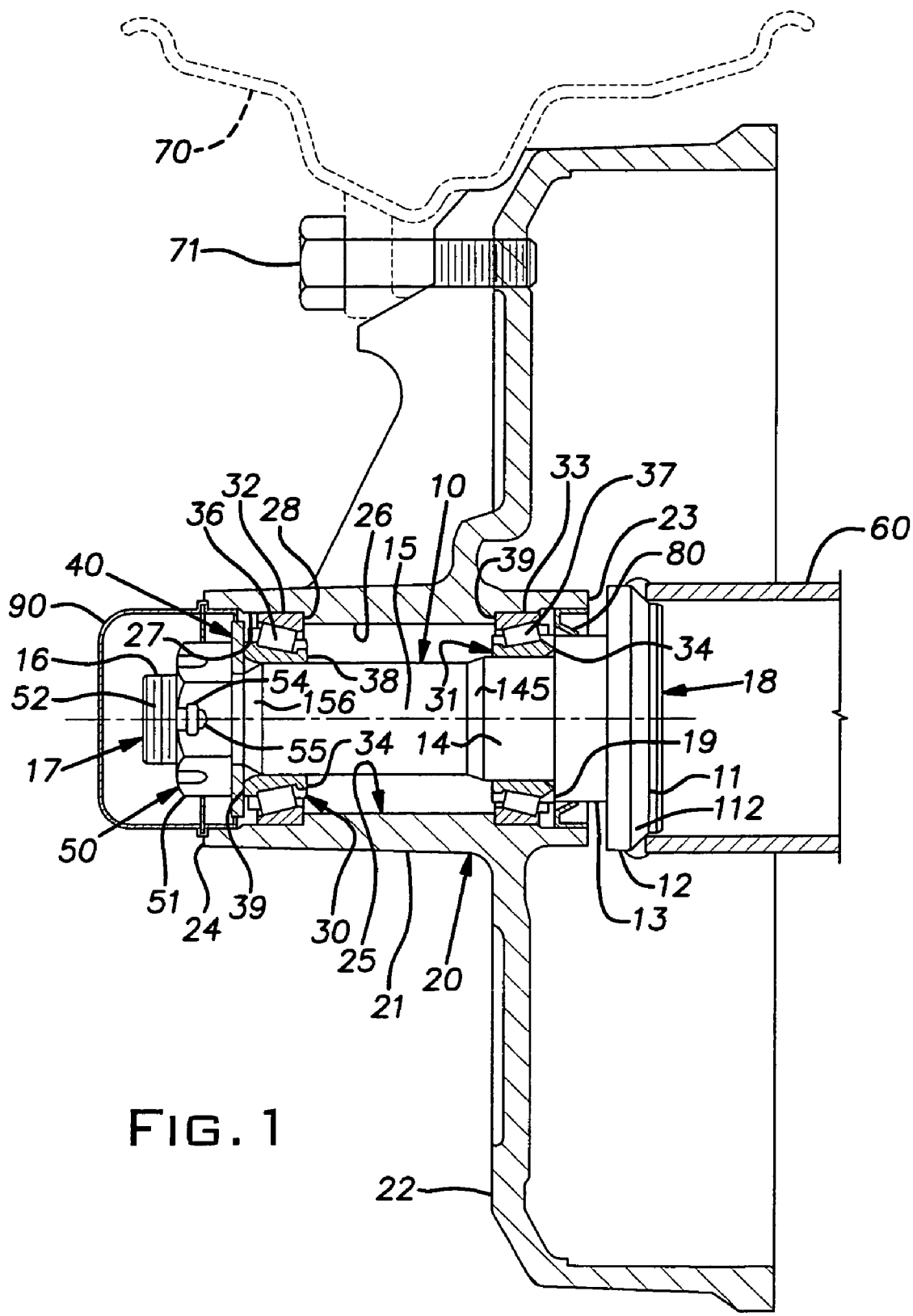
FIG. 1 is a partial cross-sectional view along the longitudinal axis of an embodiment of the spindle and hub assembly of the invention.

Referring first to FIG. 1, a partial cross-sectional view along the longitudinal axis of an embodiment of the spindle and hub assembly of the invention is shown. The assembly, in addition to comprising a spindle, indicated generally at 10, and a hub, indicated generally at 20, also includes a bearing arrangement comprising bearing components 30 and 31, an annulus 40 and a means, indicated generally at 50, separate from the annulus 40, for securing the annulus on the spindle.

The spindle 10 has a first end 17 and a second end 18 and includes a series of generally cylindrical sections 11, 12, 13, 14, 15 and 16 as well as a series of frustro-conical sections 112, 145 and 156 that each comprises, essentially, a transitional portion of the spindle that is between and joins a respective two of the adjacent cylindrical sections. Specifically, section 112 joins sections 11 and 12; section 145 joins sections 14 and 15; and section 156 joins sections 15 and 16. The spindle need not have the specific configuration described and may comprise any number of cylindrical and frustro-conical sections or sections having configurations other than cylindrical or frustro-conical.

The second end 18 of the spindle 10 is shown in FIG. 1 as attached, as by welding for example, to an axle 60 that is mounted to a vehicle, not shown, and extends axially from spindle 10 across the vehicle and is attached to a second spindle that forms a part of a second spindle and hub assembly, also not shown, on the other side of the vehicle. The axle 60 thus supports a pair of spindle and hub assemblies that transport the vehicle to which the axle is mounted. Rather than comprising an axle and a pair of spindles attached to opposite ends of the axle, the axle and spindles can be constructed of a unitary structure with the spindles being fashioned, as by machining, at respective ends of the axle. Additionally, the axle can be dispensed with and the spindle end 18 attached directly to the vehicle in a manner familiar to those skilled in the art.

The hub 20 includes a central cylindrical section 21 and, in the embodiment of the invention shown in FIG. 1, a depending section 22 that comprises a brake drum that extends radially outwardly of the cylindrical section 21. As will be familiar to those skilled in the art, a braking mechanism, not shown, including brake shoes can be located within the brake drum 22. Also as will be understood by those skilled in the art, a wheel 70 is attached to the brake drum 22 by suitable bolts or the like 71 and an inflatable tire, not shown, is mounted on the wheel 70. It is not necessary that the brake drum 22 be integral with the cylindrical section 21 of the hub 20. Rather, the cylindrical section 21 may include a radially extending flange and a separate brake drum that is attached to the radially extending flange by means of suitable fasteners can be provided.

The hub 20 has an inboard end 23 that is nearer the vehicle than an outboard end 24 of the hub. An opening 25 in the hub extends between and through the inboard end 23 and the outboard end 24 of the hub 20. The spindle 10 extends through the opening 25 in the hub 20 with the inboard end 23 of the hub being located adjacent the second end 18 of the spindle and the outboard end 24 of the hub 20 being located adjacent the first end 17 of the spindle 10. The opening 25 has a first diameter 26 toward the inboard end 23 of the hub 20 and a second diameter 27 larger than the first diameter 26 toward the outboard end 24 of the hub 20. The transitional portion of the opening 25 in the hub that is between and joins the first diameter 26 and the second diameter 27 forms a shoulder 28 in the opening 25 in the hub 20.

Supporting the hub 20 for rotation on the spindle 10 is a bearing arrangement comprising bearing components 30 and 31. Bearing component 31 comprises an outer bearing race 33 and an inner bearing race 34 having raceways for receiving roller bearings 37. Bearing component 31 is held in place between the shoulder 19, that is formed by the cylindrical sections 13 and 14 of the spindle 10, and a shoulder 28 that is provided in the opening 25 of the hub 20. Bearing component 30 comprises an outer bearing race 32 and an inner bearing race 34, each having a raceway for receiving roller bearings 36. Bearing component 30 is held in place, in part, by shoulder 28 in the opening 25 in the hub 20. Thus, the bearing component 30 has an inward face 38 that faces the inboard end 23 of the hub 20 and abuts the shoulder 28 in the opening 25 in the hub and an outward surface 39 that faces the outboard end 24 of the hub 20.

The annulus 40, shown in detail in FIGS. 2 and 3, has an opening 42 through it and an outside diameter 41. The opening 42 is of a diameter sufficiently large to allow the first end 17 of the spindle 10 to extend through the opening 41. However, the frustro-conical section 156 of the spindle is of a size that it engages the wall of the opening 42 of the annulus 40 and restrains the annulus from passing further along the spindle. The annulus has an inward surface 44 that faces and engages the outward surface 39 of the bearing component 30 and an outward surface 45 that faces the outboard end 24 of the hub 20. The first end 17 of the of the spindle 10, along cylindrical section 16, includes a flat portion 161, as best seen in FIG. 4 which is an end view of the spindle 10 alone. The opening 42 of the annulus 40 includes a complementary flat portion 43 that is in engagement with the flat portion 161 of the first end 17 of the spindle 10 so that the annulus is supported on the first end of the spindle in a manner such that the annulus does not rotate with respect to the spindle.

Means, indicated generally at 50, and separate from the annulus 40, is located at the first end 17 of the spindle for securing the annulus to the spindle. In the embodiment of the invention shown in the drawings, means 50 includes screw threads 52 on the cylindrical section 16 of the first end 17 of the spindle 10 and a hexagonal nut 51, that has complementary screw threads, screwed to the screw threads on the first end of the spindle. By screwing down on the nut 51 the nut will bear against the outward surface 45 of the annulus 40 and cause the inward surface 44 of the annulus to bear against the outward surface 39 of the bearing component 30 and secure the bearing component 30 in place against the shoulder 28 in the hub 20. To further secure the annulus 40 and the bearing component 30 in place, the first end 17 of the spindle includes an opening 53 that extends through the flat portion 161 and the centerline of the spindle 10. A locking pin 54, such as a cotter pin for example, extends through one of the slots 55 that is provided in each face of the nut 51 and the opening 53 in the spindle and is secured to the spindle and nut so as to prevent the nut 51 from coming loose from the spindle 10. Alternate means for securing the annulus to the spindle, such as a self-locking nut, may be used in place of the means shown in the drawings.

Referring to FIG. 1, it can be seen that the outside diameter 41 of the annulus 40 has a larger diameter than the first diameter 26 of the opening 25 in the hub. Consequently, the shoulder 28 will engage the inward surface 44 of the annulus 40 should the bearing component 30 not be present, as would occur if the bearing component failed. The annulus 40 would, thus, serve to prevent the hub 20 from separating the spindle 10 for a period of time sufficient to allow the operator of the vehicle to transport the vehicle to a location where the vehicle can be brought to a safe stop and appropriate corrective action taken. In the embodiment of the invention shown in the drawings, the outside diameter 41 of the annulus 40 is smaller than the second diameter 27 of the opening 25 in the hub.

A protective cover 90 is mounted to the outbound end 24 of the hub 20 in a manner that is familiar to those skilled in the art. Among its other functions, the cover 90 prevents road debris from striking and damaging the first end 17 of the spindle 10, the annulus 40 and bearing component 30 and, generally, keeps dirt away from the bearing component 30.

Also as will be familiar to those skilled in the art, a sealing ring 80 can be provided between the opening 25 in the hub 20 and the spindle 10 at the inbound end 23 of the hub.

The foregoing description of the invention is intended to enable a person skilled in the art to practice the invention. It is not intended to detail all the possible modifications and variations that will be apparent to those skilled in the art upon reading the description with reference to the drawings. It is intended, however, that all modifications be included within the scope of the invention as defined in the claims below.

What is claimed is:

1. A spindle and hub assembly comprising:

a spindle, the spindle having a first end and a second end;

a hub having an inboard end and an outboard end, a generally cylindrical opening in the hub extending between and through the inboard end and outboard end of the hub, the spindle extending through the opening in the hub with the inboard end of the hub being located adjacent the second end of the spindle and the outboard end of the hub being located adjacent the first end of the spindle, the opening in the hub having a first diameter located relatively nearer the inboard end of the hub than a second diameter, as measured in the axial direction, said second diameter being larger than the first diameter and being located relatively nearer the outboard end of the hub, than said first diameter as measured in the axial direction, a transitional portion of the opening in the hub between the first diameter and the second diameter forming a shoulder;

a bearing arrangement mounted about the spindle and supporting the hub for rotation on the spindle, the bearing arrangement having a bearing component that has an inward surface that faces the inboard end of the hub and abuts the shoulder in the opening in the hub and an outward surface that faces the outboard end of the hub;

an annulus having an opening therethrough and an outside diameter, the first end of the spindle extending through the opening in the annulus with the annulus directly engaging the first end of the spindle so that the annulus is supported on the first end of the spindle, the annulus having an inward surface that faces the outward surface of the bearing component and an outward surface that faces the outboard end of the hub, the outside diameter of the annulus and the second diameter of the opening in the hub being sized relative to each other such that the annulus moves relative to the hub and relatively towards the inboard end of the hub in the absence of the bearing component, the outside diameter of the annulus having a larger diameter than the first diameter of the opening in the hub such that the shoulder in the opening in the hub will engage the inward face of the annulus upon outward axial movement of the hub in the absence of the bearing component to prevent the annulus from axially moving past the shoulder along a direction toward the inboard end of the hub in the absence of the bearing component; and means separate from the annulus located at the first end of the spindle for securing the annulus on the spindle to prevent the spindle from axially moving relative to the annulus along the direction toward the inboard end of the hub;

wherein the inward face of the annulus engages the outward surface of the bearing component, the means separate from the annulus located at first end of the spindle for securing the annulus on the spindle bears against the outward face of the annulus causing the inward face of the annulus to bear against the outward surface of the bearing component and secure the bearing component in place against the internal shoulder in the hub, the means separate from the annulus located at the first end of the spindle for securing the annulus on the spindle includes screw threads on the first end of the spindle and a nut, having complementary screw threads, screwed to the screw threads on the first end of the spindle, the first end of the spindle includes a flat portion and the opening through the annulus includes a complementary flat portion is in engagement with the flat portion of the free end of the spindle whereby the annulus does not rotate with respect to the spindle, and the means separate from the annulus located at the first end of the spindle for securing the annulus to the spindle includes an opening that extends through the flat portion and the centerline of the spindle, and a locking pin extending through the opening in the spindle secured to the spindle and the nut so as to prevent the nut from coming loose from the spindle.

2. The spindle and hub assembly of claim 1 wherein the outside diameter of the annulus is smaller that the second diameter of the opening in the hub.

3. A spindle and hub assembly comprising:

a spindle, the spindle having a first end and a second end;

a hub having an inboard end and an outboard end, a generally cylindrical opening in the hub extending between and through the inboard end and the outboard end of the hub, the spindle extending through the opening in the hub with the inboard end of the hub being located adjacent the second end of the spindle and the outboard end of the hub being located adjacent the first end of the spindle, the opening in the hub having a first diameter located relatively nearer the inboard end of the hub than a second diameter, as measured in the axial direction, said second diameter being larger than the first diameter and being located relatively nearer the outboard end of the hub than said first diameter as measured in the axial direction, a transitional portion of the opening in the hub between the first diameter and the second diameter forming a shoulder;

a bearing arrangement mounted about the spindle and supporting the hub for rotation on the spindle, the bearing arrangement having a bearing component that has an inward surface that faces the inboard end of the hub and abuts the shoulder in the opening in the hub and an outward surface that faces the outboard end of the hub;

an annulus having an opening therethrough and an outside diameter, the first end of the spindle extending through the opening in the annulus with the annulus directly engaging the first end of the spindle so that the annulus is supported on the first end of the spindle, the annulus having an inward surface that faces the outward surface of the bearing component and an outward surface that faces the outboard end of the hub, the outside diameter of the annulus being smaller than the second diameter of the opening in the hub, the outside diameter of the annulus being radially spaced away from the hub with the presence of the bearing component, the annulus being axially spaced away and not touching the shoulder of the hub with the presence of the bearing component, the outside diameter of the annulus and the second diameter of the opening in the hub being sized relative to each other such that the annulus moves relative to the hub and relatively towards the inboard end of the hub a distance to the shoulder, and the outside diameter of the annulus being larger than the first diameter of the opening in the hub such that the shoulder engages the annulus when the annulus relatively moves the distance to the shoulder in the absence of the bearing component to prevent further relative axial movement of the hub and annulus beyond the distance, and means separate from the annulus located at the first end of the spindle for securing the annulus on the spindle, the annulus is engaged with at least one of the spindle and the means separate from the annulus located at the first end of the spindle for securing the annulus on the spindle to prevent axial movement of the annulus relative to the spindle, and in the absence of the bearing component preventing further relative axial movement of the hub and the spindle beyond the relative distance moved for the shoulder to engage the annulus to prevent the spindle from axially moving relative to the annulus along the direction toward the inboard end of the hub;

wherein the means separate from the annulus located at the first end of the spindle for securing the annulus to the spindle includes an opening that extends through the centerline of the spindle, and a locking pin extending through the opening in the spindle secured to the spindle and the nut so as to prevent the nut from coming loose from the spindle.

\* \* \* \* \*